Sept. 9, 1924.  
F. J. KELLY  
AUTOMOBILE BODY  
Filed May 9, 1923
1,507,607
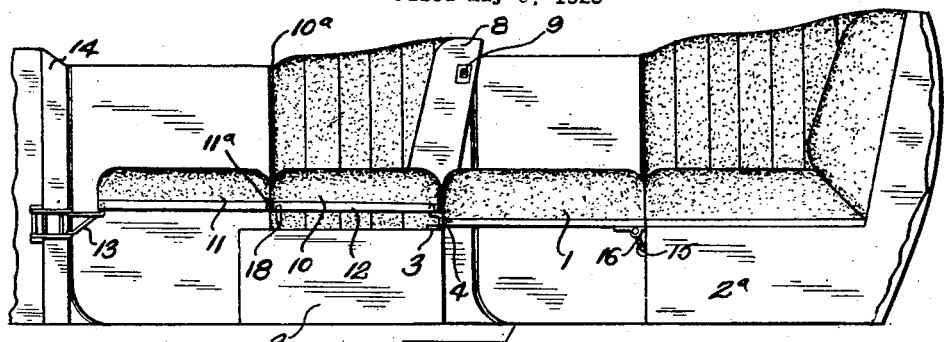
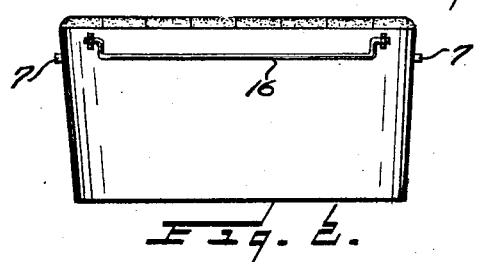
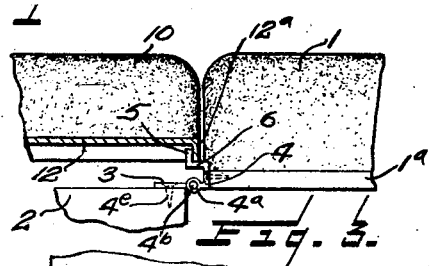
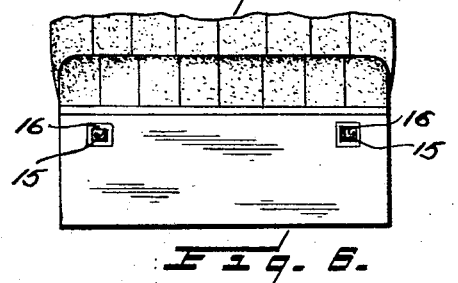
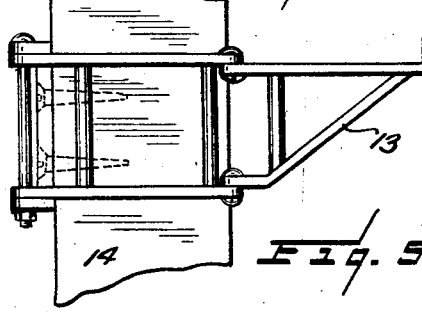
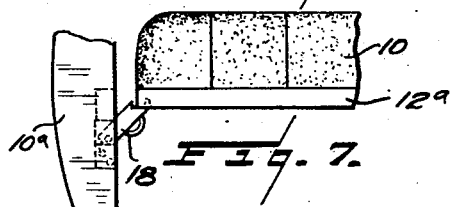
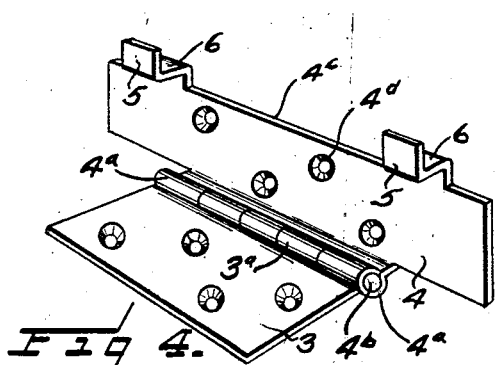
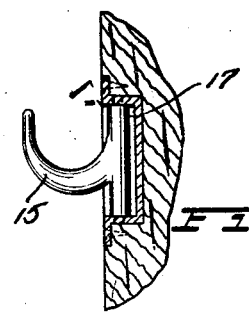

Patented Sept. 9, 1924.

1,507,607

UNITED STATES PATENT OFFICE.

FRANK JACK KELLY, OF TORONTO, ONTARIO, CANADA.

AUTOMOBILE BODY.

Application filed May 9, 1923. Serial No. 637,858.

*To all whom it may concern:*

Be it known that I, FRANK JACK KELLY, of the city of Toronto, in the county of York and Province of Ontario, Dominion of Canada, have invented certain new and useful Improvements in Automobile Bodies; and I hereby declare that the following is a full, clear, and exact description of the same.

My invention, relating to improvements in that class of automobiles in which the seats are constructed with hinged backs that can be selectively raised to a vertical or substantially vertical position, or lowered to a horizontal or substantially horizontal position, with relation to the seat cushion, is characterized by a specially designed hinge which will connect the seat back to the seat frame and support the seat cushion and hold it against longitudinal displacement when the seat back is lowered to the horizontal position.

It is also characterized by a set of pivoted brackets, co-operating with the hinges and adapted for engagement with a rail attached to the seat back, for supporting the latter in its lowered position and preventing its further downward displacement; and is further characterized by a set of pivoted brackets and pivoted struts, co-operating with the hinges for supporting the seat cushion above the seat frame when the back is lowered.

In the drawings:

Fig. 1 is a broken elevation of an automobile body with the front seat back, and front seat cushions in the same plane as the back seat cushion.

Fig. 2 is a rear elevation of the front seat back,

Fig. 3 is a fragmentary side elevation of the front seat back in its lowered position, showing the hinge connecting the seat back to the seat frame and supporting the seat cushion, Fig. 4 is a perspective view of the hinge, Fig. 5 is a side elevation of the folding bracket for supporting the seat front cushion.

Fig. 6 is a front elevation of the rear seat,

Fig. 7 is a fragmentary front elevation of the front seat showing one of the pivoted struts, and Fig. 8 is a detail view of one of the brackets for engagement with the rail of the front seat back when lowered.

Referring to the drawings:

2 represents the frame of the front seat which may be of any usual or approved construction and to the top of which is hinged the seat back 1. The hinges employed for this purpose are similar in principle to those known as butt hinges and each hinge is composed of two members 3 and 4 formed with the usual hinge sockets $3^a$, $4^a$ respectively, through which is entered a hinge pin $4^b$. The edge $4^c$, of the hinge member 4, that is opposite the hinge member $4^a$, is formed with angular-shaped projections of a substantially Z-shape and these projections are so located and spaced as to lie against the side edges of the hinge member 3 when the hinge member 4 is folded against it, so that the two hinge members can contact, and lie flat against each other when the seat back 1 is raised to its vertical position. Each of these angular projections comprise two essential parts 5 and 6 of which the part 6 is at right-angles to the plane of the hinge member 4 and the part 5 is at right-angles to the part 6 and parallel with the plane of the hinge member 4.

In each of the hinge members 3 and 4 are apertures $4^d$ for the screws $4^e$ by which the hinge is connected to the seat frame and to the seat back. As shown in Fig. 3 the hinge member 3 is fastened by screws $4^e$ to the top surface of the seat frame 2 with the hinge sockets overlying the rear edge of the seat frame and the hinge member 4 is similarly fastened to the bottom edge of the solid portion $1^a$ of the back 1 with the angular projections extending beyond the front or top face of the solid portion $1^a$. In the same figure the bottom 12 of the front seat cushion 10 is shown to be constructed of angle-iron with the edge of the side $12^a$ seated on the part 6 of the angular projection and the part 5 of the angular projection engaging the side $12^a$ and establishing an interlocking engagement with it for preventing the longitudinal movement of the seat cushion 10.

The depth of the parts from the bottom of the hinge member 4 to the surface of the seat part 6 is such, in relation to the depth from the bottom edge of the side 12ª to the top of the cushion 10, as to maintain the top surface of that cushion in the same plane as the surface of the seat back 1 in its lowered position.

In Fig. 1 the front seat is shown to be provided with a supplemental cushion 11. This cushion is hinged to the cushion 10 and when the front seat is used for sitting purposes the cushion 11 is folded under the cushion 10 and occupies the space between the bottom of the latter cushion and the top of the seat frame 2. In this position the cushion 11 supports the cushion 10 from the seat frame. When the seat back 1 is in a vertical position the hinge member 4 lies against the hinge member 3 with the angular projections disengaged from the side 12ª and embracing the side edges of the hinge member 3.

Pivoted in the sides 10ª of the automobile body in line with the bottom 12 of the cushion 10 are struts 18. When the cushion 11 is folded beneath the cushion 10 these struts are moved back into the body 10ª as indicated in dotted lines in Fig. 7. When the cushion 11 is extended into the position shown in Fig. 1 the struts 18 are moved out of their recesses in the body 10ª into engagement with the bottom 12 of the cushion 10 and co-operate with the hinges in supporting the cushion 10 in its elevated position above the seat frame 2, as shown in Fig. 1. The hinge connection 11ª between the cushions 11 and 10 supports the rear edge of the cushion 11. The front or opposite edge of the cushion 11 is supported by brackets 13 which are hingedly secured to body posts 14 preferably located adjacent to the sides of the car body. The brackets 13 are adapted to fold inwards and lie against the body when not required to support the cushion 11. Hook-shaped brackets 15 are hinged to the front of the rear seat frame 2ª and these brackets are so located as to engage the rail or rod 16 that is fastened to the seat back 1 when the seat back is in the lowered or horizontal position and hold the seat back against further downward displacement. When not required for use the brackets 15 swing into a recess 17 provided for that purpose in the rear seat frame.

To maintain the seat back 1 in its vertical position its side edges are provided with latches 7 which enter corresponding keepers 9 in the body sides or preferably in uprights 8 extending from the front seat frame 2.

The construction and arrangement of the parts hereinbefore described provides a conveniently convertible type of automobile seat which can be selectively used either for sitting or reclining and sleeping purposes and which can be quickly adjusted to either of these uses, and the special form of hinge performs three functions; viz, hinging the seat back to the seat frame; supporting the seat cushion in its properly elevated position; and holding the seat cushion against longitudinal displacement.

Having thus fully described my invention what I claim is new and desire to secure by Letters Patent is:

1. In an automobile body having front and rear seats, in combination, a hinged seat back releasably secured at its upper end to the supporting framework, and a hinge connecting the lower end of the seat back to the supporting framework comprising a hinge member fastened to the framework and a hinge member fastened to the seat back and carrying angular lugs for supporting and locking engagement with one section of a two-part seat cushion, said section of the cushion resting in locked engagement upon the angular lugs of the hinge member.

2. In an automobile body in combination a front seat comprising two hingedly connected seat sections adapted to be either extended into the same plane or folded one under the other, a seat back releasably secured at its upper end to the supporting framework and a hinge connecting the lower end of the seat back to the supporting framework comprising a hinge member fastened to the frame work and a hinge member fastened to the seat back and carrying angular lugs for supporting and locking engagement with one of the seat sections, pivoted struts on opposite sides of the body frame cooperating with said lugs in supporting said last mentioned seat section above the supporting framework in alignment with said seat back, and hook-shaped brackets hinged to body posts for supporting the forward end of the other seat section.

3. In an automobile body in combination a front seat comprising two hingedly connected seat sections adapted to be extended into the same plane or folded one under the other, a seat back releasably secured at its upper end to the supporting framework and a hinge connecting the lower end of the seat back to the supporting framework comprising a hinge member fastened to the framework and a hinge member fastened to the seat back and carrying angular lugs for supporting and locking engagement with one of the seat sections, pivoted struts on opposite sides of the body frame cooperating with said lugs in supporting said last-mentioned section above the supporting framework in alignment with said seat back, hook-shaped brackets upon body posts for supporting the forward end of the other seat section when extended, a rod extended transversely along the seat back and hook-shaped brackets pivotally connected to the rear seat frame for locking engagement with said rod when said seat back is in a lowered position.

4. In an automobile body as claimed in claim 1 in which the bottom of one of the two hingedly connected seat sections is constructed of angle iron for locking engagement with the angular lugs of the hinge pivotally connecting the seat back with the seat frame.

Dated at the said city of Toronto, this 14th day of April, A. D. 1923.

FRANK JACK KELLY.

Witnesses:
   STANLY RICHES,
   WM. T. MILLER.